United States Patent
Prokhorov et al.

(10) Patent No.: US 10,139,823 B2
(45) Date of Patent: Nov. 27, 2018

(54) METHOD AND DEVICE FOR PRODUCING VEHICLE OPERATIONAL DATA BASED ON DEEP LEARNING TECHNIQUES

(71) Applicant: Toyota Motor Engineering & Manufacturing North America, Inc., Erlanger, KY (US)

(72) Inventors: Danil V. Prokhorov, Canton, MI (US); Matthew O. Derry, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 140 days.

(21) Appl. No.: 15/263,963

(22) Filed: Sep. 13, 2016

(65) Prior Publication Data
US 2018/0074493 A1 Mar. 15, 2018

(51) Int. Cl.
*G05D 1/00* (2006.01)
*G05D 1/02* (2006.01)
*G06N 3/04* (2006.01)

(52) U.S. Cl.
CPC .......... *G05D 1/0088* (2013.01); *G06N 3/0454* (2013.01); *G05D 1/024* (2013.01); *G05D 1/0246* (2013.01)

(58) Field of Classification Search
CPC .... G05D 1/0088; G05D 1/0246; G01C 21/34; G06N 3/08; G06N 3/02; G05B 13/00
USPC ...................................... 701/25, 23
See application file for complete search history.

(56) References Cited

U.S. PATENT DOCUMENTS

| | | | |
|---|---|---|---|
| 2009/0319112 A1 | 12/2009 | Fregene et al. | |
| 2010/0299013 A1 | 11/2010 | Dolgov et al. | |
| 2011/0035150 A1* | 2/2011 | Sundarraj | G01S 5/0072 |
| | | | 701/301 |
| 2013/0325323 A1* | 12/2013 | Breed | G01C 21/34 |
| | | | 701/420 |
| 2015/0141043 A1* | 5/2015 | Abramson | G01C 21/34 |
| | | | 455/456.1 |
| 2015/0217449 A1* | 8/2015 | Meier | B25J 9/1602 |
| | | | 700/257 |
| 2017/0176991 A1* | 6/2017 | Hoskeri | G01C 21/34 |
| 2017/0206426 A1* | 7/2017 | Schrier | G05D 1/0088 |
| 2017/0357257 A1* | 12/2017 | Yang | G05D 1/0088 |

(Continued)

OTHER PUBLICATIONS

"The development of neural network based vision for an autonomous vehicle", https://www.slideshare.net/Otitoaleke/the-development-of-neural-network-based-vision-for-an-autonomous-vehicle; Published on Dec. 12, 2012; Accessed Mar. 29, 2018 (Year: 2012).*

(Continued)

*Primary Examiner* — Krishnan Ramesh
(74) *Attorney, Agent, or Firm* — Christopher G. Darrow; Darrow Mustafa PC

(57) ABSTRACT

A method and device for effecting vehicle control is presented. The method includes receiving driving map data, which includes vehicle target data relative to a vehicle location data. The driving map data is processed to produce desired vehicle operational data, the desired vehicle operational data facilitates a vehicle to traverse a travel route. From the desired vehicle operational data vehicle, corresponding actuator control data is produced, and transmitted to effect vehicle control in either of the autonomous or driver-assisted modes.

14 Claims, 10 Drawing Sheets temporal data sets 500

(56) References Cited

U.S. PATENT DOCUMENTS

2018/0059679 A1* 3/2018 Taimouri ............. G05D 1/0248
2018/0074501 A1* 3/2018 Boniske ............... G05D 1/0088

OTHER PUBLICATIONS

Chen et al, "DeepDriving: Learning Affordance for Direct Perception in Autonomous Driving", 15th IEEE International Conference on Computer Vision (2015) in 9 pages.
Bojarski et al, "End to End Learning for Self-Driving Cars", Cornell University Library (2016) in 9 pages.
Szegedy et al, "Deep Neural Networks for Object Detection", Advances in Neural Information Processing Systems (2013) in 9 pages.
Sotelo et al, "A Color Vision-Based Lane Tracking System for Autonomous Driving on Unmarked Roads", Autonomous Robots 16, 2004, pp. 95-116, Kluwer Academic Publishers, The Netherlands.
Liu et al., "Implementation of Training Convolutional Neural Networks", arXiv preprint arXiv:1506.01195 (2015) in 10 pages.
Van Den Berg et al, "Roadmap-Based Motion Planning in Dynamic Environments", IEEE Transactions on Robotics, vol. 21, No. 5, Oct. 2005, pp. 885-897.
Goodfellow et al., "Multi-digit Number Recognition from Street View Imagery using Deep Convolutional Neural Networks", arXiv:1312.6082v4 (2014) in 13 pages.

* cited by examiner vehicle network 201 vehicle control unit 200 autonomous decision module 304 vehicle 100
(autonomous mode)

Vehicle Control Unit 200

METHOD AND DEVICE FOR PRODUCING VEHICLE OPERATIONAL DATA BASED ON DEEP LEARNING TECHNIQUES

BACKGROUND

Autonomous vehicle control has been based on vehicle sensor monitoring. The vehicle sensors relied upon have been based on forward video capture, as well as forward proximity sensor sensing, relating to recognition of scenarios immediately ahead of the vehicle. Forward sensing (in the first-person or some other frame of reference from a vehicle) coupled with appropriate sensor processing to recognize has been relied on to adjust the vehicle velocity and to issue corresponding vehicle controls. It is desirable that an autonomous vehicle have a capability to provide autonomously-adjusted operations beyond consideration of simply local environment condition sensing, and further desirable to provide autonomously-adjusted operations taking into consideration learned driving experiences and/or behaviors.

SUMMARY

Device and method for image recognition of data and based upon the recognition of learned driving experiences and/or behaviors, and the producing of vehicle operational data for a vehicle in an autonomous mode or a driver-assist mode, to traverse a travel route to achieve a vehicle target, are disclosed.

In one implementation, a method in a vehicle control unit for effecting vehicle control is disclosed. The method includes receiving driving map data that includes vehicle target data relative to a vehicle location data. The driving map data is processed to produce desired vehicle operational data, which facilitates a vehicle to traverse a travel route. Producing from the desired vehicle operational data vehicle actuator control data, and transmitting the vehicle actuator control data to effect the vehicle control.

In another implementation, a method to generate a training input for an autonomous decision device for a vehicle control unit is disclosed. In the method, a plurality of map data is generated that depicts at least one vehicle obstacle. For each one of the plurality of map data, vehicle location data is tracked that relates to the at least one vehicle obstacle at a predetermined time interval, and vehicle sensor data is embedded that corresponds to the vehicle location data. The method continues, generating a plurality of temporal data sets that each include a plurality of temporally-sequenced data. The plurality of temporal data sets are provided for training the autonomous decision device, where, when trained, may be operable to produce desired vehicle operational data based on a driving map data input.

In another implementation, a vehicle control unit for vehicle operation is disclosed. The vehicle control unit includes a wireless communication interface, a processor, and a memory. The wireless communication interface is operable to service communication with a vehicle network. The processor is coupled to the wireless communication interface, and is for controlling operations of the vehicle control unit. The memory is coupled to the processor, and is for storing data and program instructions used by the processor. The processor being configured to execute instructions stored in the memory to receive driving map data that includes vehicle target data relative to a vehicle location data. The processor executed instructions to process the driving map data to produce desired vehicle operational data, which facilitates a vehicle to traverse a travel route. The processor being configured to execute instructions to produce from the desired vehicle operational data vehicle actuator control data, and to transmit the vehicle actuator control data to effect the vehicle control.

BRIEF DESCRIPTION OF THE DRAWINGS

The description makes reference to the accompanying drawings wherein like reference numerals refer to like parts throughout the several views, and wherein.

DETAILED DESCRIPTION

Figure 1:
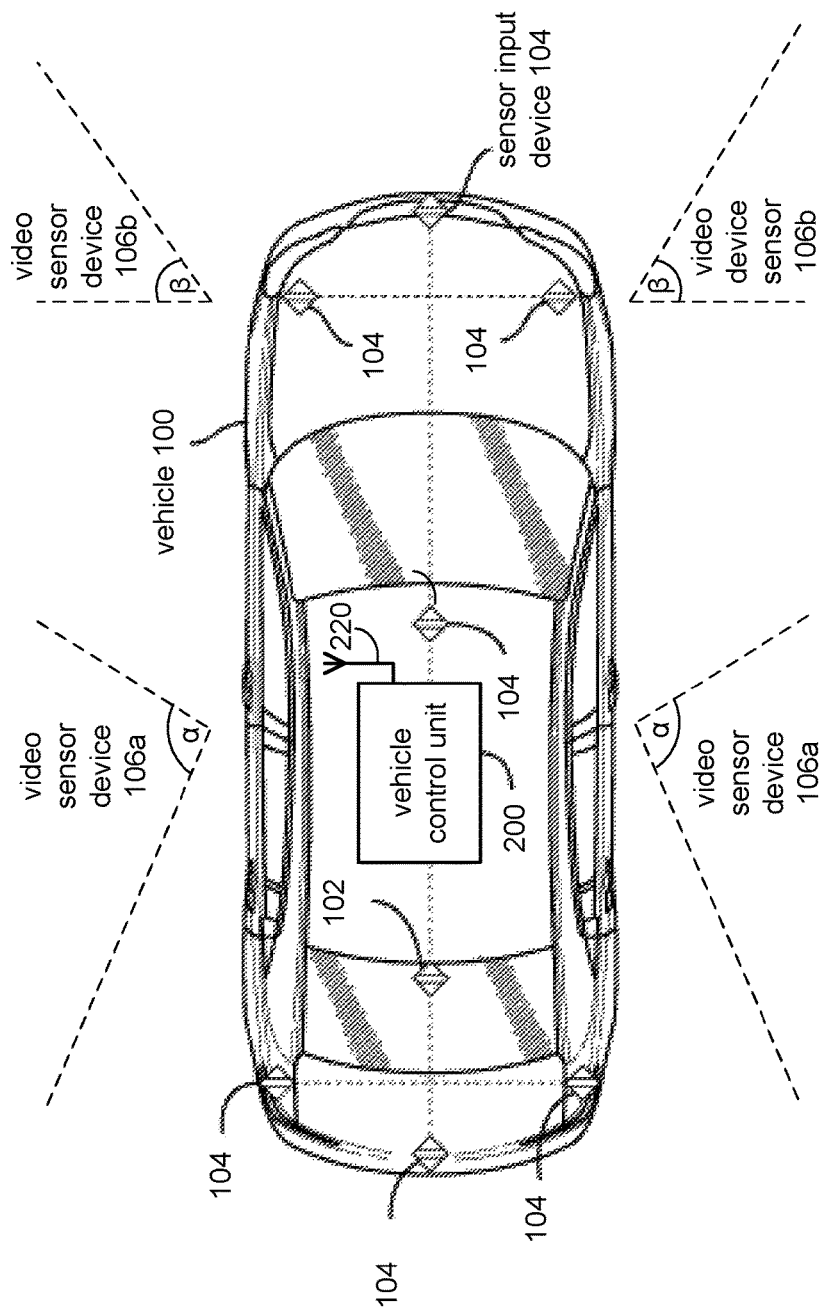
FIG. 1 is a schematic illustration of a vehicle including a vehicle control unit.

Producing desired vehicle operational data to achieve a vehicle target data by an autonomous vehicle is described herein. The desired vehicle operational data provides for vehicle velocity control data, vehicle acceleration control data, steering wheel angle control data, vehicle braking data, vehicle engine braking data, etc., singularly and/or in various combinations thereof.

One example method provides for use of in a vehicle control unit for effecting autonomous vehicle control based on a driving map methodology. With driving map data, an autonomous decision device processes driving map data, which may include several map layers of information and/or data, to produce the desired vehicle operational data to traverse (such as via a travel route) the driving intentions map data to a vehicle target data.

Desired vehicle operational data may be based on a training and/or learning applied to the vehicle control unit. The training and/or learning relate to vehicle operational responses to vehicle obstacles defined by instances of mapping data. Accordingly, as vehicle obstacles are recognized in a travel route leading to a vehicle target (such as a location defined by user input received by a graphic user interface), a vehicle control unit applies functional operations in response to circumnavigate the vehicle obstacles.

The training and/or learning may be provided by deep neural network platform. In deep learning, the deep neural network may be trained based on numerous temporal data sets embedded with vehicle sensor data relating to vehicle operation with respect to vehicle obstacles presented by the temporal data sets. The deep learning captured by a deep neural net may be portable to other autonomous-capable vehicles with similar operational characteristics.

As may be appreciated by one of skill in the art, a deep neural network trained in this manner operates to decouple autonomous control signal generation from a present-time, intensive data processing load of multi-modal vehicle sensor data, tracking data and other short-term prediction data from a vehicle perception system. As an aspect of the embodiments herein, the deep neural network presents a knowledge-base of processed information data and/or experience data based on a learning based on previous driving experience data. This information data and/or experience data may then be drawn on to produce desired vehicle operational data based on a map layers and/or data input relating to a travel route of a vehicle.

The temporal data sets may be presented as mapping data layers that include various information, such as position, velocity, acceleration, geophysical objects, roadways, pathway signage (such as stop signs, traffic signals, crosswalks, etc.), destination categories (food, hotel, entertainment, etc.), and the like. In the example of mapping content, the sum of several data layers may provide that content. Several services may populate this data, such as geocoding, geodatabase, geometry, image, maps, location-based content (such as geographical points, lines, polygons of interest, etc.), and the like. These services may be accessed via a third-party server(s) 233 and based on various mapping data standards specifications such as an Open Geospatial Consortium Web Feature Service (OGC WFS), an OGC Web Map Service (WMS) web service, an OGC Web Map Tile Service (WMTS) web service, GeoRSS file, etc.

Data layers may include categories of data and/or references to the data, such as the input size for the data, such as resolution and image size (such as number of pixels) and a color depth (such as the bits per pixel). In a travel context, additional data may include further information. For example, one set of data may relate to traffic conditions, another to destinations, another to information based on location, etc. Map layer data may also be based on vector imaging and/or raster imaging, under a number of available data and/or file types. Data formats generally relating to geospatial data under a geographic information system (GIS), which relates to capture, storage, verification, and display of data related to positions relative to the planet's surface, and may display various data on a map. Examples of data formats may include keyhole markup language (KML), keyhole markup language zipped (KMZ), GPX exchange format (GPX), and/or the like, and/or combinations thereof.

Each of the temporal data sets may include first temporal data, second temporal data, and third temporal data, which operate to convey proximity (distance data), velocity data, and acceleration data, respectively. Vehicle sensor data may be embedded to further provided desired vehicle operational data relative to a driving map data provided by a user, via a graphic user interface, a handheld mobile device, etc.

Embodiments of the present disclosure are directed to autonomous vehicle operation and methods wherein information generated or otherwise may be provided by an application executing on user equipment and/or a mobile device relate to providing driving map data including vehicle target data relative to vehicle location data (such as provided via GPS, cell tower triangulation methods, etc.). An example of user equipment and/or a handheld mobile device includes a cell phone, a smart phone, a personal digital assistant, tablet computer, e-readers, laptop computers, etc.

FIG. 1 is a schematic illustration of a vehicle 100 including a vehicle control unit 200. A plurality of sensor devices 104 and 106 are in communication with the control unit 200. The plurality of sensor devices 104 and 106 can be positioned on the outer surface of the vehicle 100, or may be positioned in a concealed fashion for aesthetic purposes with regard to the vehicle. Moreover, the sensor devices may operate at frequencies in which the vehicle body or portions thereof appear transparent to the respective sensor device.

Communication between the sensor devices may be on a bus basis, and may also be used or operated by other systems of the vehicle 100. For example, the sensor devices 104 and 106 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100. Moreover, the sensor devices 104 and/or 106 may be further coupled to the vehicle control unit 200 via such communication-system architectures.

The sensor devices 104 and/or 106 operate to monitor ambient conditions relating to the vehicle 100, including visual and tactile changes to the vehicle environment. The sensor devices include sensor input devices 104 and video sensor devices, 106a and 106b.

The sensor input devices 104 provide tactile or relational changes in the ambient conditions of the vehicle, such as an approaching person, object, vehicle, etc. The one or more of the sensor input devices 104 may be configured to capture changes in velocity, acceleration, and/or distance to these objects in the ambient conditions of the vehicle 100, as well as the angle of approach. The sensor input devices 104 may be provided by a Light Detection and Ranging (LIDAR) system, in which the sensor input devices 104 may capture data related to laser light returns from physical objects in the environment of the vehicle 100. The sensor input devices 104 may also include a combination of lasers (LIDAR) and milliwave radar devices.

The video sensor devices 106a and 106b include associated fields of view. For the example of FIG. 1, the video sensor device 106a has a three-dimensional field-of-view of angle-α, and the video sensor device 106b has a three-dimensional field-of-view of angle-β, with each video sensor having a sensor range for video detection.

In various driving modes, the examples of the placement of the video sensor devices 106a for blind-spot visual sensing (such as for another vehicle adjacent the vehicle 100) relative to the vehicle user, and the video sensor devices 106b are positioned for forward periphery visual sensing (such as for objects outside the forward view of a vehicle user, such as a pedestrian, cyclist, etc.).

In autonomous operations directed by the vehicle control unit 200, the video sensor devices 106a and 106b may be further deployed to read lane markings and determine vehicle positions with the road to facilitate the relocation of the vehicle 100.

For controlling data input from the sensor devices 104 and/or 106, the respective sensitivity and focus of each of the sensor devices may be dynamically adjusted to limit data acquisition based upon speed, terrain, activity around the vehicle, etc.

For example, though the field-of-view angles of the video sensor devices 106a and 106b may be in a fixed relation to the vehicle 100, the field-of-view angles may be adaptively increased and/or decreased based upon the vehicle's driving mode, such as a highway driving mode to take in less of the ambient conditions in view of the more rapidly changing conditions relative to the vehicle 100, a residential driving mode to take in more of the ambient conditions that may change rapidly (such as a child's ball crossing in front of the vehicle, etc.), a parking mode in which a full field-of-view may be used to increase a sensitivity towards changes in ambient conditions relative to the vehicle 100, with the sensitivity extended further to realize changes in at least one ambient condition relative to the vehicle.

The vehicle 100 may also include options for operating in manual mode, modes of different kinds of automation (e.g., fully automated, longitudinal-only, lateral-only, etc.), and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode of operation, a computing device, which may be provided by the vehicle control unit 200, or in combination therewith, can be used to control one or more of the vehicle systems without the vehicle user's direct intervention. Some vehicles may also be equipped with a "driver-assist mode," in which operation of the vehicle 100 may be shared between the vehicle user and a computing device. For example, the vehicle user can control certain aspects of the vehicle operation, such as steering, while the computing device can control other aspects of the vehicle operation, such as braking and acceleration.

When the vehicle 100 is operating in autonomous (or driver-assist) mode, the vehicle control unit 200 issues commands to the various vehicle systems to direct their operation, rather than such vehicle systems being controlled by the vehicle user.

As shown in FIG. 1, the vehicle control unit 200 is configured to provide wireless communication with a user device through the antenna 220, other vehicles (vehicle-to-vehicle), and/or infrastructure (vehicle-to-infrastructure), which is discussed in detail with respect to FIGS. 2-10.

Figure 2:
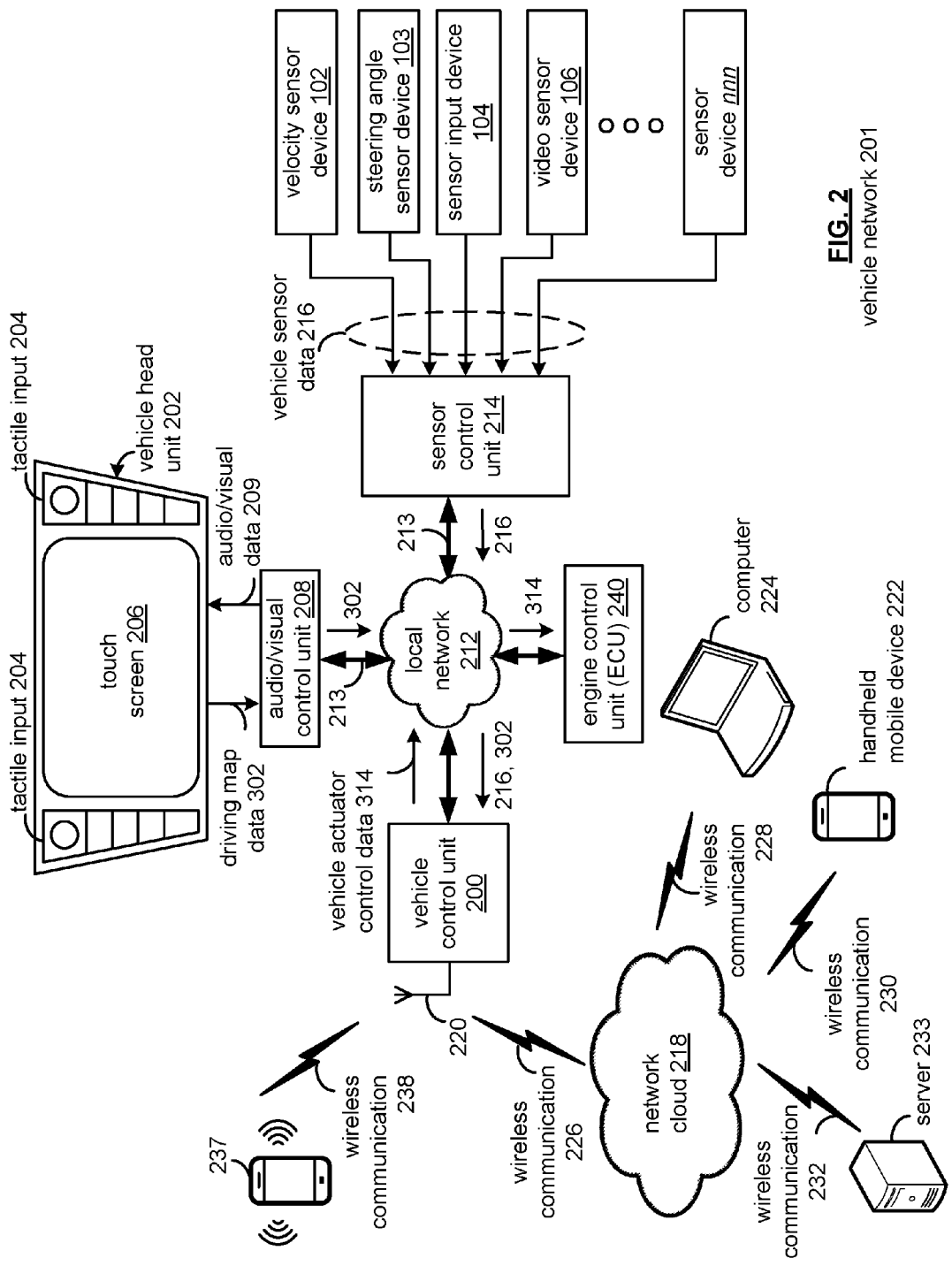
FIG. 2 is a block diagram of vehicle control unit of FIG. 1 in the context of a network environment.

Referring now to FIG. 2, a block diagram of a vehicle control unit 200 in the context of a network environment 201 is provided. While the vehicle control unit 200 is depicted in abstract with other vehicular components, the vehicle control unit 200 may be combined with the system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in FIG. 2, the vehicle control unit 200 communicates with a head unit device 202 via a communication path 213, and also communicatively coupled with a network cloud 218 via an antenna 220 and wireless communication 226. In this manner, the vehicle control unit 200 operates to receive input data, and provide data to, the vehicle head unit 202, audio/visual control unit 208, the sensor control unit 214, the engine control unit (ECU) 240, and other devices that may communicatively couple via the network could 218, such as computer 224, handheld mobile device 222 (for example, cell phone, a smart phone, a personal digital assistant (PDA) devices, tablet computer, e-readers, laptop computers, etc.).

The vehicle control unit 200 may provide autonomous vehicle control on a local sensor basis, on a driving target basis, and/or a combination thereof.

Autonomous vehicle control on the driving target basis (or driving target-based autonomous control) relates to decisions, actions and/or strategies beyond the present environment of the vehicle, and to achieving a vehicle target and/or goal (such as a destination, driving manner, etc.), based on a vehicular past-responses to vehicle obstacles (such as, travel route characteristics).

On a local sensor basis, the vehicle 100 reacts, via the vehicle control unit 200, to processed sensor inputs relaying information regarding the local vehicle environment. The frame-of-reference is analogous to a driver's field of view (such as a forward looking, or first person, perspective view. The vehicle control unit 200, via the sensor control unit 214, may access sensor data 216 of the velocity sensor device 102, steering angle sensor device 103, sensor input device 104, video sensor device 106, through sensor device nnn, to effect local autonomous vehicle control.

With the sensor data 216, the vehicle control unit 200 may operate may operate to read lane markings, determine vehicle positions with the road to facilitate the autonomous control of the vehicle 100. For further example, the vehicle sensor data 216 operates to permit external object detection through the vehicle control unit 200. External objects may include other vehicles, roadway obstacles, traffic signals, signs, trees, etc. In this manner, the sensor data 216 may allow the vehicle 100 (see FIG. 1) to assess its environment and react to increase safety for vehicle passengers, external objects, and/or people in the environment.

On a driving target basis, autonomous decision devices of the vehicle control unit 200 effects autonomous vehicle control. Differing from the local sensor basis discussed above, a driving target basis considers a top view as a vehicle 100 traverses a travel route of a map.

From the top view, as related to mapping a travel route, the autonomous vehicle control, such as by vehicle actuator control data 314, may be based on decisions, actions and/or strategies that relate to obstacle recognition of driving map data. Upon generating an obstacle recognition proximal to the vehicle (that is, the vehicle location data indicates the vehicle is within a pertinent range of the mapping data for autonomous vehicle controls to be applied), the vehicle control unit 200 operates to generate a functional response (such as velocity, acceleration, steering, braking, and/or a combination thereof, etc.) to traverse the recognized obstacle based on a machine learning and/or training. The machine learning and/or training may be based past experience with such obstacles and/or similar obstacles (with either a human operator and/or simulation). Autonomous vehicle control based on driving target process is discussed in detail with reference to FIGS. 3-9.

As may be appreciated, driving target-based autonomous control may be complement local sensor-based autonomous control. Coarse vehicle control may be applied to navigate recognized obstacles presented by a travel route (such as roadway curves, turnabouts, traffic signals, etc.), while local sensor-based autonomous control provides finer vehicle control relating to changing conditions that may not be provided in a mapping environment (such as neighboring vehicles unexpectedly changing lanes, debris in the roadway, etc.).

Still referring to FIG. 2, the audio/visual control unit 208 operates to provide, for example, audio/visual data 209 for display to the touch screen 206, as well as to receive driving map data 302 via a graphic user interface. Generally, driving map data may be displayed via the vehicle head unit 202, and driving map data 302 may be received relating to a vehicle target. In this manner, the vehicle control unit 200 may decouple processing for autonomous operations (such as actuator/control signal generation) from processing for sensor operation by generating the obstacle map for deep learning techniques to provide autonomous vehicle control functions.

The audio/visual control unit 208 may operate to provide the driving map data 302 to the vehicle network 201 for dissemination to other vehicle control units (such as vehicle control unit 200), as well as operate to receive driving map data 302 via the handheld mobile devices of a user (such as handheld mobile devices 222, 235, etc.), the network cloud 218, etc.

The audio/visual data 209 and driving map data 302 may include audio data, hands-free phone data, voice control data, navigation data, USB connection data, DVD play function data, multifunction meter function data, illumination signal data for the touch screen 206 (such as dimming control), driving status recognition data (such as vehicle speed, reverse, etc. via sensor data 216), composite image signal data (such as data via sensor input device 104), etc.

The vehicle head unit 202 includes, for example, tactile input 204 and a touch screen 206. The touch screen 206 operates to provide visual output or graphic user interfaces such as, for example, maps, navigation, entertainment, information, infotainment, and/or combinations thereof.

The touch screen 206 may include mediums capable of transmitting an optical and/or visual output such as, for example, such as a liquid crystal display (LCD), light emitting diode (LED), plasma display or other two dimensional or three dimensional display that displays graphics, text or video in either monochrome or color in response to display audio/visual data 209.

Moreover, the touch screen 206 may, in addition to providing visual information, detect the presence and location of a tactile input upon a surface of or adjacent to the display. The tactile input may presented to a user by devices capable of transforming mechanical, optical, or electrical signals into a data signal capable of being transmitted via the communication path 213 by the audio/visual control unit 208. The tactile input 204 may present a number of movable objects that each transform physical motion into a data signal that can be transmitted over the communication path 213 such as, for example, a button, a switch, a knob, a microphone, etc. Accordingly, the graphic user interface may receive mechanical input directly upon the visual output provided by the touch screen 206.

Also, the touch screen 206 may include at least one or more processors and one or more memory modules for displaying and/or presenting the audio/visual data 209 from the audio/visual control unit 208, and to receive and provide driving map data 302 to the vehicle network 201 via the local network 212.

As may be appreciated, the touch screen 206 and the tactile input 204 of the vehicle head unit 202 may be combined as a single module, and may operate as an audio head unit or an infotainment system of the vehicle 100. The touch screen 206 and the tactile input 204 may also be separate from one another and operate as a single module by exchanging signals via a communication path 213.

As may be appreciated, the communication path 213 of the vehicle network 201 may be formed by a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 and local network 212 may be provided by a vehicle bus structure, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

For displaying mapping data via the touch screen 206, the vehicle network 201 may be communicatively coupled to receive signals from global positioning system (GPS) satellites, such as via the antenna 220 of the vehicle control unit 200, or other such vehicle antenna (not shown). The antenna 220 may include one or more conductive elements that interact with electromagnetic signals transmitted by global positioning system satellites. The received signals may be transformed into a vehicle location data and/or signal indicative of the vehicle's location (for example, latitude and longitude positions). The received signals may further be indicative of the positioning of the vehicle 100 with respect to travel route data, in which a vehicle position can be indicated on a map displayed via the touch screen 206, or displayed via the display screens via the computer 224 over wireless communication 228, or the handheld mobile device 222 over wireless communication 230 through the network cloud 218.

The wireless communication 226, 228, 230 and 232 of the network cloud 218 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As is noted above, the vehicle control unit 200 may be communicatively coupled to a computer 224 via wireless communication 228, a handheld mobile device 222 via wireless communication 230, etc. As described in more detail below, application data may be provided to the vehicle control unit 200 from various applications running and/or executing on wireless platforms of the computer 224 and the handheld mobile device 222, as well as from the vehicle head unit 202 via the local network 212 of the vehicle network 201.

The handheld mobile device 222 and/or computer 224, by way of example, may be a device including hardware (for example, chipsets, processors, memory, etc.) for communicatively coupling with the network cloud 218, and also include an antenna for communicating over one or more of the wireless computer networks described herein.

Also, in reference to FIG. 2, a server 233 may be communicatively coupled to the network cloud 218 via wireless communication 232. The server 233 may include third party servers that are associated with applications that running and/or executed on the handheld mobile device 222, the computer 224, the vehicle head unit 202, etc.

For example, application data associated with a first application running on the handheld mobile device 222 (e.g., OpenTable) may be stored on the server 233. The server 233 may be operated by an organization that provides the application, and application data associated with another application running on the mobile device 233 may be stored on yet another server. It should be understood that the devices discussed herein may be communicatively coupled to a number of servers by way of the network cloud 218.

Figure 3:
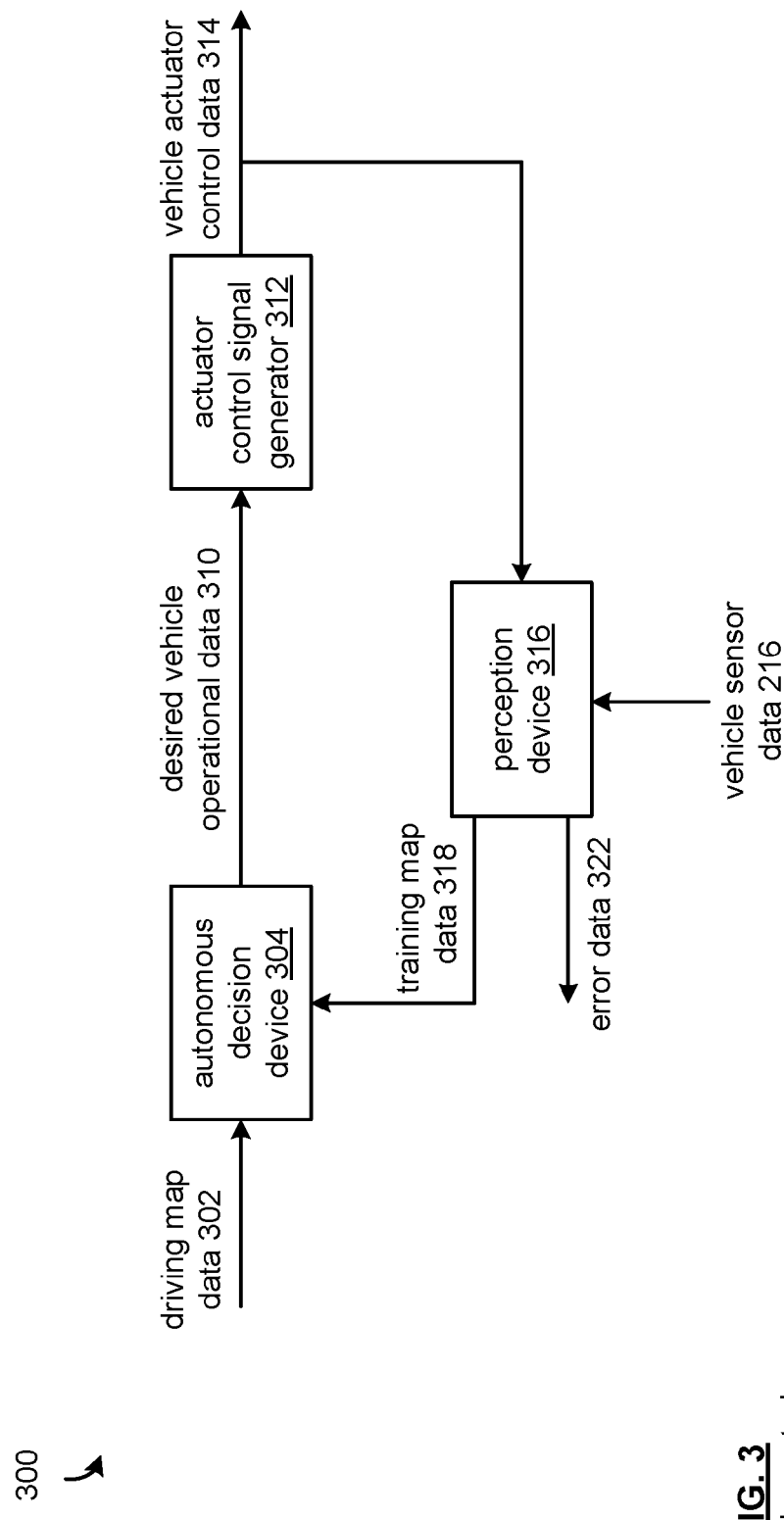
FIG. 3 is a functional block diagram of vehicle control unit of FIG. 1 for producing vehicle actuator control data based on driving map data input.

FIG. 3 is a block diagram 300 of vehicle control unit 200 illustrating production of vehicle actuator control data 314 based on driving map data 302 inputs. The vehicle control unit 200 may include an autonomous decision device 304, an actuator control signal generator 312, and a perception device 316.

In operation the autonomous decision device 304 receives driving map data 302, and produces desired vehicle operational data 310, such as a coarse velocity, a coarse acceleration, a coarse steering angle, etc. The autonomous decision device 304 may include a deep neural network.

As may be appreciated, the desired vehicle operational data 310 may be provided in various formats. For the example of velocity and steering angle functions, the operational data may simply be a desired velocity value in crisp or fuzzy terms (for example, faster, much faster, slower, much slower, etc.) and a general steering angle value in crisp or fuzzy logic terms (such as slight right, slight left, hard right, hard left, etc.). Other forms of data values may be provided, such as setting the velocity speed (10 mph, 20, mph, 30 mph, etc.) and steering angle (10-degrees, 20-degrees, etc.), or as a vector, indicating magnitude (such as velocity) and associated angle of travel (for example, 10-degrees of north, etc.). Visual and/or audio feedback may also be provided to the vehicle operator, such as through the touch screen 206 of the head unit 202, and/or the handheld mobile devices 222 and 237, for example.

Generally, and as an example of a deep neural network, a convolutional neural network (CNN) includes an input of images, in which layers of the neural network are arranged in three-dimensional depths, including pixel width, pixel height, and image depth. The image depth may be based on the number of channels to render the image.

For example, under a red-green-blue (RBG) color scheme and/or image model, the channels provide red, green, and blue for sensing, representation, and display of digital images, such as via touch screen 206 of the vehicle head unit 202 (see FIG. 2).

As may be appreciated, other color schemes and/or image models may be implemented, such as RGBA (that is, a red channel, a green channel, a blue channel, and an alpha channel relating to pixel opacity), YUV (luminance, u-axis, v-axis), phase alternating line (PAL) color encoding, YIQ (luminance, chrominance axes IQ) color scheme, and/or variations thereof.

With an image input, a deep neural network, such as a convolutional neural network (CNN) conventionally operates to provide image recognition and/or classification with low error rates. Applications may include letter recognition systems, facial recognition systems, etc., that produce identification of the subject of the image inputs. As may be appreciated, the deep neural network as described in detail herein operates to provide desired vehicle operational data 310.

Generally, referring to the example of FIG. 3, a convolutional neural network may include a convolutional layer having parameters with a set of trainable filters. For example, during a forward pass, each filter is convolved across a pixel width and pixel height of the input volume (or input depth), and compute dot products between the entries of the filter and the input at any position. A two-dimensional activation map results, providing responses of that filter at each spatial position.

A deep neural network trains the filters to activate based on a visual feature (for example, an edge of some orientation or a blotch of some color on a layer (such as, for example, a red channel).

Referring to FIG. 3, the autonomous decision device 304 receives a driving map data 302, and produces desired vehicle operational data 310 to traverse the driving map data to achieve a target expressed by vehicle target data. The autonomous decision device 304 operates, in effect, to recognize travel route obstacles in the mapping data, and based on the recognition, produce desired vehicle operational data 310.

As may be appreciated, obstacles may be discerned by pixel characteristics exhibiting certain shapes, spectral, and spatial characteristics that can be further grouped into obstacles. The obstacles may be grouped into classes that represent real-world features on the ground.

The deep neural network of the autonomous decision device 304 is discussed in detail with reference to FIGS. 4-10.

The actuator control signal generator 312 receives the desired vehicle operational data 310 and produces vehicle actuator control data 314. The actuator control data 314 may be provided to an appropriate vehicle control unit for implementation of the desired vehicle operational data 310. For example, when the data 314 relates to vehicle velocity and/or acceleration, the engine control unit (ECU) 240 may receive the data and apply appropriate control signals to the engine throttle, transmission, etc., or when the data 314 a relates to steering angle, an electronic stability control unit may receive the data and apply the appropriate control signals to a steering actuator. As may be appreciated, the desired vehicle operational data 310 may indicate singular vehicle-device control (such as velocity, etc.), partial vehicle-device control (such as velocity acceleration, velocity deceleration, etc.), and/or total vehicle-device control (such devices within a vehicle powertrain).

The perception device 316 functions to evaluate performance of the autonomous decision device 304, and to generate additional training data. The perception device 316 receives the vehicle actuator control data 314 and actual applied controls, as indicated by the vehicle sensor data 216, and produce error data 322.

The perception device 316 generates training map data 318 from the vehicle actuator control data 314 and the driving map data 302, along with the error data 322. The training map data 318 is applied to the deep neural network to further improve parameter optimization of the deep neural network's convolutional layer.

Figure 4:
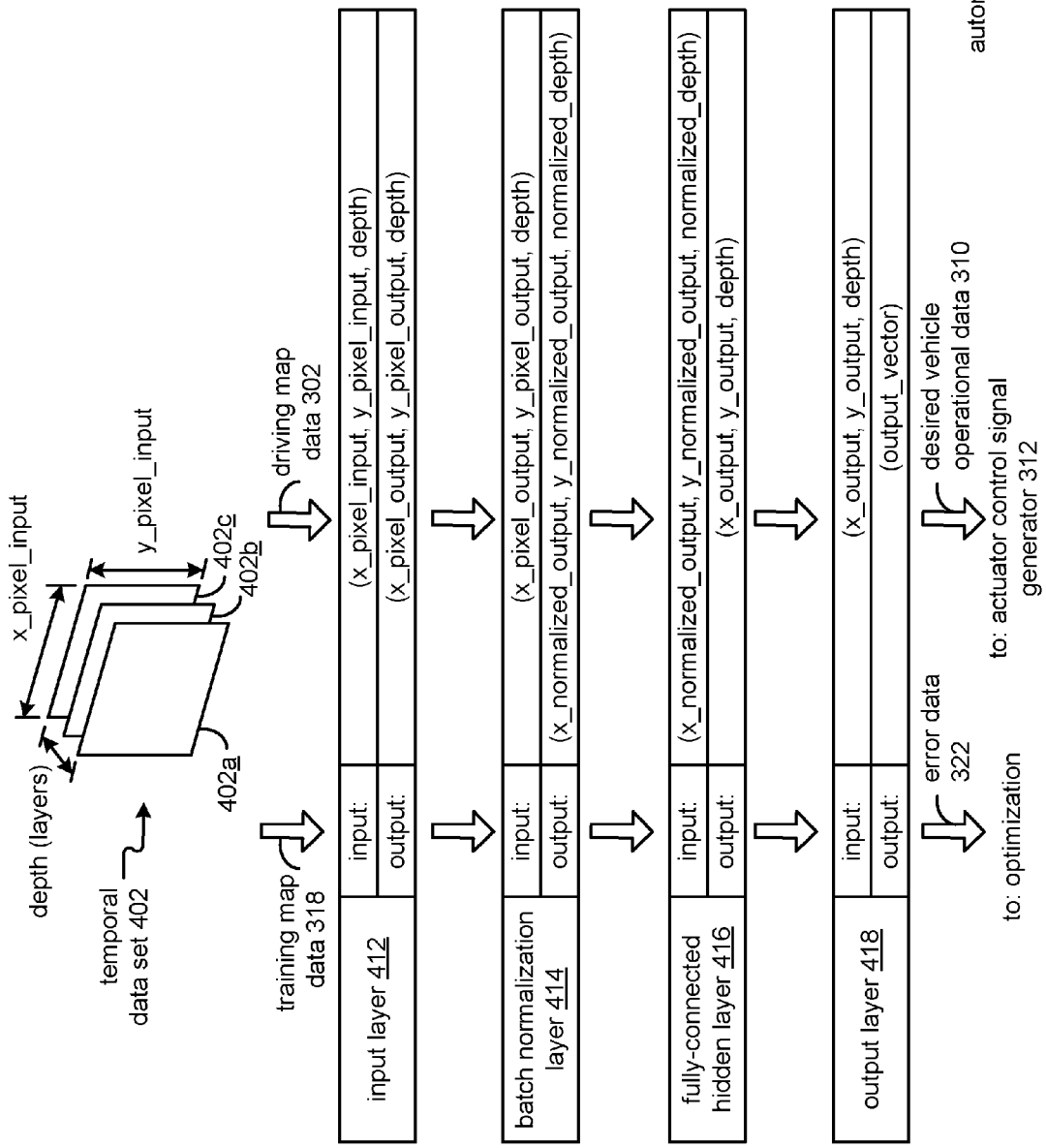
FIG. 4 is an illustration of applying training map data to train a deep neural network of the autonomous decision module of FIG. 3.
Figure 5:
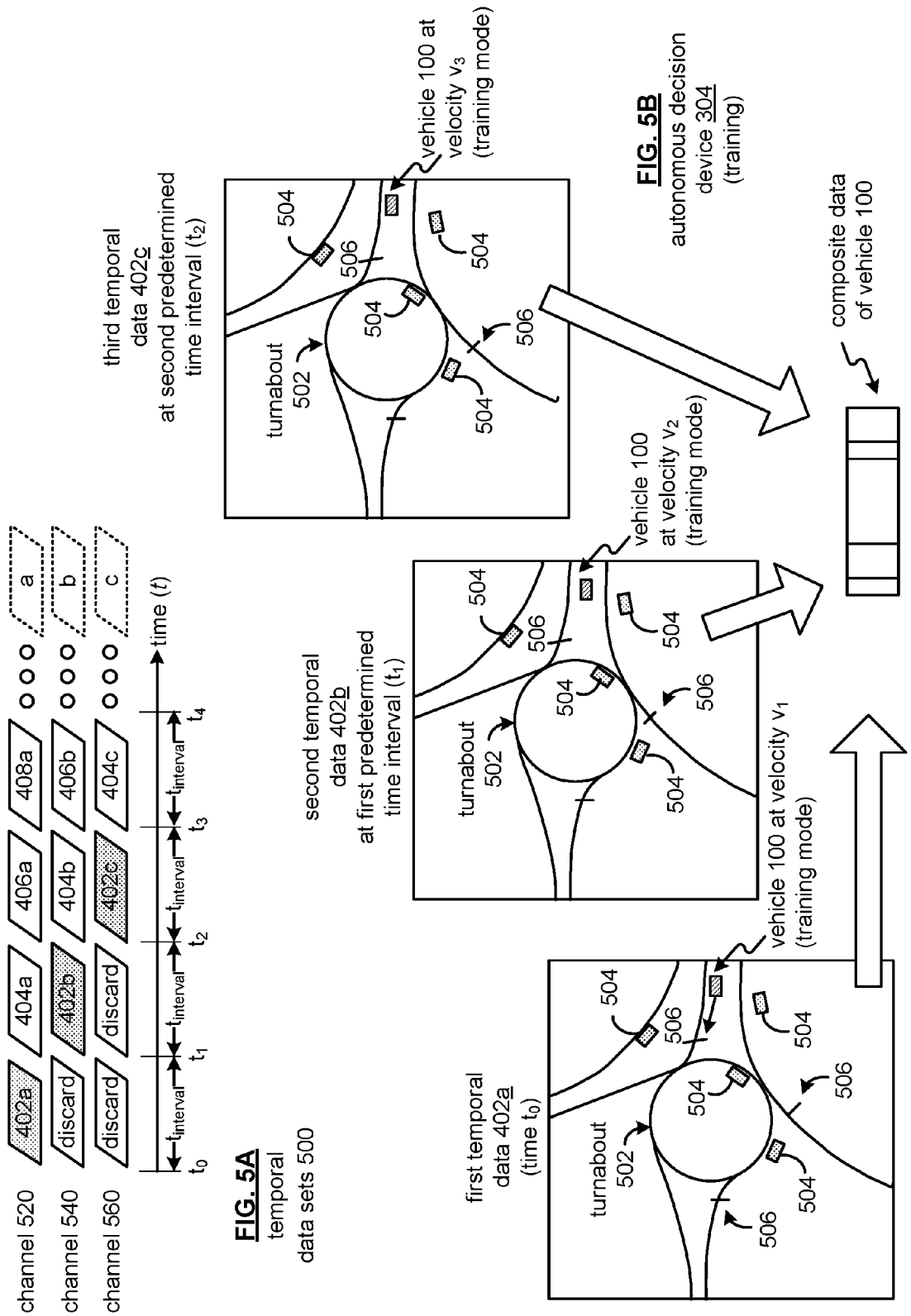
FIGS. 5A and 5B are block diagrams illustrating forming training map data of FIG. 3.
Figure 6:
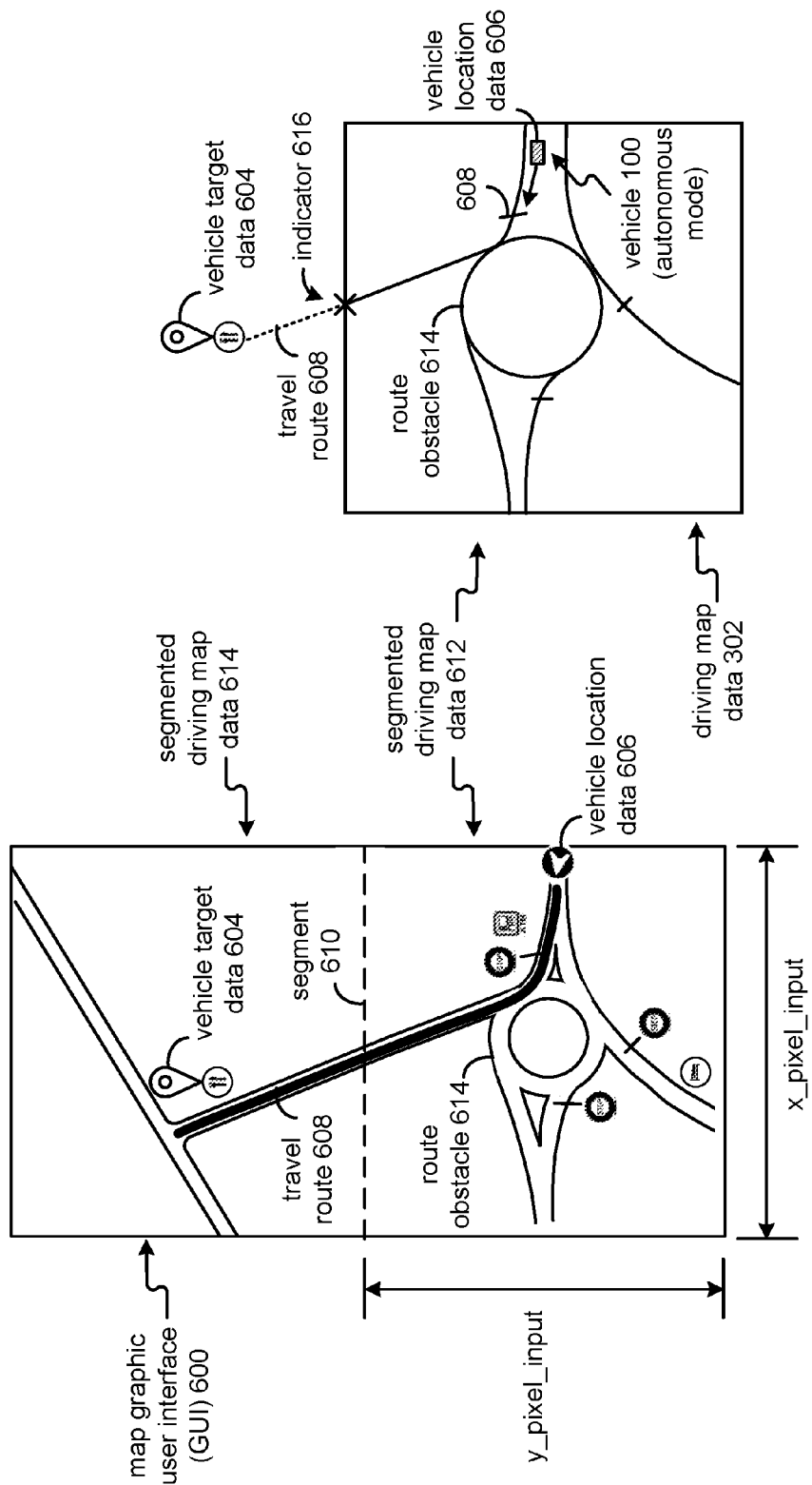
FIGS. 6A and 6B are illustrating examples of a map graphic user interface to produce driving map data input.

FIG. 4 is an illustration of applying training map data 318 to train a deep neural network of the autonomous decision device 304. The autonomous decision device 304 may include an input layer 412, a batch normalization layer 414, a fully-connected hidden layer 416, and an output layer 481.

As one of skill in the art may appreciate, the autonomous decision device 304 operates as a deep neural network to provide functional vehicle data (such as desired vehicle operational data 310) to an actuator control based upon input data recognition. As may be appreciated the deep neural network may be provided as a type of feed-forward artificial neural network such as convolutional neural network (CNN), and in other embodiments, as a recurrent neural network (RNN), a combination thereof (for example, a neural abstraction pyramid), etc.

Generally, a deep neural network as discussed herein transforms an original image layer-by-layer (such as provided by temporal data set 402) from original pixel input values to a functional control "score" output—that is, the desired vehicle operational data 310.

The input layer 412 receives the training map data 318. In the example of FIG. 4, the provided, the training map data 318 is provided as a temporal data set 402.

The temporal data set 402, in the example provided, includes an x_pixel_input, by y_pixel_input, and a depth, that relates to the number of layers for the data set 402. For simplifying the example of FIG. 4, the temporal data set 402 may include the plurality of time-series data 402a (e.g., position), 402b (e.g., velocity) and 402c (e.g., acceleration), which are accompanied by corresponding vehicle control signals. In the example of the embodiment provided, the depth of layers may be provided by red, green and blue (RGB) channels, providing a red layer, a green layer, and a blue layer.

As may be appreciated, other color schemes, image models and/or translations may be implemented, such as RGBA (that is, a red channel, a green channel, a blue channel, and an alpha channel, which relates to pixel opacity), YUV (luminance, u-axis, v-axis), phase alternating line (PAL) color encoding, YIQ (luminance, chrominance axes IQ) color scheme, and/or variations thereof. Moreover, the depth of data layers may be greater than the basic display data, such as a geospatial data layer, a geolocation site data layer, a landmark data layer, etc.

The temporal data set 402 may be presented as mapping data layers that includes various information, such as position (402a), velocity (402b), acceleration (402c), and further layers that may relate to geophysical object data, roadway data, pathway signage data (such as stop signs, traffic signals, crosswalks, etc.), destination category data (food, hotel, entertainment, ratings, etc.), and the like. Mapping content may be the sum of some and/or all of the map data layers.

Third party services may populate the map layer data, such as geocoding, geodatabase, geometry, image, maps, location-based content (such as geographical points, lines, polygons of interest, etc.), and the like. These services may be accessed via a third-party server(s) 233 (see FIG. 2) and based on various mapping data standards specifications such as an Open Geospatial Consortium Web Feature Service (OGC WFS), an OGC Web Map Service (WMS) web service, an OGC Web Map Tile Service (WMTS) web service, GeoRSS file, etc.

The input layer 412 of the autonomous decision device 304 receives the training map data 318 for deep learning/training of the autonomous decision device 304, and the driving map data 302 for generating desired vehicle operational data 310. The input layer 412 may hold raw pixel values of the input data provided by the training map data 318 and/or driving map data 302. The input dimensions of the training map data 318 and/or the driving map data 302 may be based upon a design or structure of the input layer 412. In this regard, other varying dimensions may be implemented based upon efficiency, data size, data amounts, etc. As may be appreciated, an image size decreases with the depth, and layers near the input layer 412 correspondingly may have fewer filters while layers further in may have a greater number.

The batch normalization layer 414 of the autonomous decision device 304 allows higher training rates and serves to simplify initialization, or starting point. For example, a batch normalization layer 414 realizes similar accuracy rates with fewer training steps.

The fully-connected hidden layer 416 of the autonomous decision device 304 receives the output of the batch normalization layer 414. The term "fully-connected" relates to a user of convolutions over an input generate an output, providing a local connection, where each region of an input is connected to a neuron of an output. Each layer applies different filters (as may also be referred to as parameters). The fully-connected hidden layer 416 operates to perform transformations that are a function of activations based on the input, but also of filter (that is, weights and biases of the layer's neurons).

For example, as may be appreciated by one of skill in the art, a transformation may operate to detect edges, which in turn bases a decision on identifying an obstacle of the training map data 318, and outputs a corresponding desired vehicle operational data 310.

The filters (or as may be referred, neurons) in the fully-connected hidden layer 416 are trained on a stochastic, or on-line, gradient descent algorithm, which provides a filter update for each training sample. An example of a stochastic gradient descent algorithm for training the deep neural network may include an Adaptive Moment Estimation (ADAM). Other examples for training may include Adaptive Gradient (AdaGrad) algorithm, Root Mean Square Propagation (RMSProp), etc.

During a training phase generally, a deep neural network learns the values of its filters based on the task to perform. A deep neural network may learn to detect edges from raw pixels of the map data 318, and then detect simple shapes—that is, each filter composes local level features (such as edges, lines, curves, etc.) into higher-level representations (for example, a turnabout). The higher level representations are then used to base the desired vehicle operational data 310. An example is a vehicle velocity at a given vehicle location with regard to the map data 318.

The output layer 418 may also be fully-connected to the preceding fully-connected hidden layer 416. The resulting output of the desired vehicle operational data 310 may be flattened to a vector form (as the output_vector). In the example of a vehicle velocity, the vector provides a desired velocity of a plurality of available velocities.

FIGS. 5A and 5B are block diagrams illustrating temporal data sets 500 generally produced by fusing information from multiple vehicle sensors, some of which may have different modalities of operation (for example, Radar, LiDAR, etc.) The temporal data sets 500 of the example of FIGS. 5A and 5B may be used to train a deep neural network of the autonomous decision device 304.

Referring to the example of FIG. 5A, an image is formed on a red-green-blue (RGB) color schemed provided by a channel 520, channel 560 and channel 560. The temporal data set 500 includes temporally-sequenced data 402a, 402b, and 402c, which may be temporally-spaced with respect to one another by a predetermined time interval to provide a composite image staggered in time. As may be appreciated by one of skill in the art, further sets may include temporally-sequenced data 404a, 404b, 404c, and 406a, 406b, 406c, etc.

Referring to FIG. 5B, illustrated is an illustration of the temporal data set 500 of FIG. 5A for training a deep neural network of the autonomous decision device 304. As shown, the first temporal data 402a represents a time to. The image illustrates a turnabout 502 having various ingresses and egresses. Generally, a turnabout is a continuously moving traffic circle that flows in one direction and serves as an intersection for two or more roads. Vehicles 100 and 504 may enter a turnabout by yielding or stopping, at 506 to oncoming traffic, because moving vehicles 504 in the turnabout 502 have the right of way.

Each of the successive data 402a, 402b and 402c in their respective time progression provides motion data relating to non-static objects. For example, data 402a provides information as to vehicle location (x, y), that may be further defined by GPS location data, cell tower triangulation, etc. The second temporal data 402b provides information as to vehicle velocity (v). The third temporal data 402c provides information as to acceleration (or deceleration).

The data 402a, 402b and 402c may be combined into a composite representation by converting each to grayscale, for example, and placing the grayscale pixel values into the channels 502, 504 and 506, respectively, to generate a grayscale composite image. In the example of FIG. 5B, a composite image overlay of the vehicle 100 (and vehicles 504) over time provides a staggered representation illustrating the relative position, velocity, and acceleration with regard to the data 402a, 402b and 402c. When "equally" staggered time representations are present in the composite image, the velocity is considered a constant, and the rate of acceleration is accordingly zero. In the alternative, as the image comes into alignment, but not at equal rates, either an acceleration or deceleration is represented, or a resulting change in vehicle velocity.

As noted with respect to FIG. 3, the data 402a, 402b and 402c are embedded with vehicle sensor data 216, which operates to provide a training for producing desired vehicle operational data 310.

With the example of FIG. 5B, deep learning by the autonomous decision device 304 operates to provide driving rule learning and/or experience. For example, vehicle 100 approaches the turnabout 502 at a velocity $V_1$, which is a deceleration to yield or stop at position 506. The successive data 402b conveys a further reduction in a magnitude of velocity $V_2$, and successive data 402c conveys a magnitude of deceleration rate (relating to velocity $V_3$). With such training, the autonomous decision device 304 may operate to process driving map data to produce desired vehicle operational data to traverse the driving map data to a vehicle target data.

The autonomous decision device 304 operates to correlate training map data 318 with a temporal sequence of autonomous control data. The training map data 318, relative to the vehicle 100, may be associated with the vehicle operational data to produce a desired vehicle operational data based on deep learning. For example, with training, the deep neural network learns the object of stop and/or yield signage 506, and provides a deceleration and/or stoppage of the vehicle.

For aiding in training, additional examples of model (or competent) driving examples relating to the vehicle obstacles are collected, including interaction with other vehicles 504 (such as prolonging a period to enter the turnabout 502 due to traffic congestion), and provided as temporal data sets to the autonomous decision device 304. For training of the autonomous decision device 304, a non-limiting example of volume of temporally-sequenced data may be in the thousands or tens-of thousands at a predetermined time interval $t_{interval}$, based on tens or hundreds of vehicle obstacles of a vehicle route.

Appreciably, with a deep neural network trained on training map data 318, which with respect to the turnabout configuration of FIGS. 5A and 5B, may be within at a ratio of about fifty or more samples per travel route encounter. On a test case of about four hundred (known) samples of driving map data map 302, the error data 322 is generally zero centered within minimal standard deviation. A random control signal, by comparison, realizes a large deviation, without null error centering characteristics. As may be appreciated by those of skill in the art, additional optimization of the deep neural network may be realized with further training, and applying stochastic gradient descent algorithms, such as ADAM, etc.

In the example of FIG. 5B, a velocity characteristic is considered for clarity. Those of skill in the art may appreciate that the vehicle sensor data 216 (see FIG. 2) may also include vehicle acceleration data, steering wheel angle, vehicle braking data, vehicle transmission braking data, etc.

FIGS. 6A and 6B are illustrations providing examples of a map graphic user interface 600 that includes vehicle target data 604 and vehicle location data 606, and a vector rendering of the map GUI 600 to produce driving map data 302 for input to the autonomous decision device 304 for effecting autonomous vehicle control a vehicle 100. The map GUI 600 and the driving map data 302 are centered on the route obstacle 614, but may also be centered with respect to other objects, such as the vehicle 100 via vehicle location data 606. As may be appreciated, other centering objectives may be used that may affect an efficiency of image identification and resulting functional outputs.

The example of FIG. 6A presents a route obstacle 614, which is a turnabout or driving circle. For clarity of the examples of FIGS. 6A and 6B, various destination icons are present with the route obstacle, such as restaurant icons, hotel icons, cash machine icons, etc. A user may select a destination icon or address generally, and a map GUI 600 is presented for display, via audio/visual control unit 208 (and/or handheld mobile devices 222, 237, etc.).

With the GUI 600, a user may select a vehicle target data 604. Also shown by the map GUI 600 is a vehicle location data 606, displayed as a vehicle navigation icon. Upon selection of vehicle target data 604, a travel route 608 is generated for travel from the vehicle location data 606 to the vehicle target data 614. Other information related to street map GUI are shown, such as other streets, intersections, traffic flow, compass direction, etc.

In the example of FIG. 6A, the size of the GUI 600 exceeds a dimensional input for the deep neural network. Though the horizontal portion may be x_pixel_input length, the vertical portion is double the input size of y_pixel_input. As may be appreciated by one of skill in the art, the GUI 600 may be generally scalable, however, the granularity of the image and definition of the objects of the image are taken into consideration regarding image scalability.

FIG. 6B is an example of the map GUI 600 provided as segmenting the map GUI 600 to produce segmented driving map data 612 and driving map data 302. The driving map data 302, though presented in visual form for clarity, is a composition of vector, or machine language, numbers that may be processed. As may be understood, a travel route 608 may encompass a large range, and correspondingly, large data amounts. To reduce a processing overhead to more local environments, driving map data 612 may be segmented, or divided, to dimensions and/or data sizes that relate to an input layer 412 of the autonomous decision device 304.

The driving map data 308 may include the travel route 608 with a vehicle target data 604, and vehicle 100, identified by vehicle location data 606. The driving map data 302 segment includes the vehicle location data 606, indicating a need for vehicle actuator control data 314 (see FIG. 3). Because the vehicle target data 604 may not yet be within a segment of the driving map data 302, an indicator 616 is placed on a boundary or edge of the driving map data 308 indicating a desired direction of autonomous and/or semi-autonomous travel by the vehicle 100.

The vehicle actuator control data 314 may relate to singular aspects of vehicle control to all aspects of vehicle control. For example, the control data 314 may relate to vehicle velocity and/or acceleration. The engine control unit (ECU) 240 may receive the data 314 and apply appropriate control signals to the engine throttle, transmission, etc., relating to the vehicle velocity and/or acceleration.

As a further example when the control data 314 relates to steering angle, an electronic stability control unit of the vehicle network 201 may receive the data and apply the appropriate control signals to a steering actuator.

As may be appreciated, the desired vehicle operational data 310, and subsequent conversion and/or translation to vehicle actuator control data 314 by the actuator control signal generator 312, may indicate singular vehicle-device control (such as velocity, etc.), partial vehicle-device control (such as velocity acceleration, velocity deceleration, steering angle, etc.), and/or total vehicle-device control (such devices within a vehicle powertrain and directional control).

Simplifying the example provided, a singular aspect relating to velocity is determined by the autonomous decision device 304. The vehicle 100, based on the vehicle location data 606 and the indicator 616 (based on the vehicle target data 604), operates to autonomously travel a route 608 from the position indicated by the vehicle location data 606 to the indicator 616. The route 608 includes a route obstacle 614, such as a turnabout, that the vehicle 100 traverses to achieve the target data 604.

On approach to the obstacle 614, the deep neural network of the autonomous decision device 304 (see FIG. 3) identifies a deceleration of the vehicle 100 to pixels/data at a yield or stop 608. Nearing the yield 608, the deceleration comes to zero, or no substantial velocity. Merging onto the turnabout, the vehicle velocity and acceleration rate autonomously increases to further the achievement of the vehicle target data 604.

As may be appreciated, viable control of longitudinal velocity of a vehicle 100 in achieving a target objective generally requires consideration beyond an immediate environment of the vehicle 100. A perspective sensor view (aligned with the longitudinal axis of the vehicle 100) may not detect subtle changes in view perspective (that is, whether an object ahead is coming closer or farther) in a timely fashion, and may in some instances cause false changes, affecting longitudinal, or forward/reverse, travel. Accordingly, sensor based tracking for velocity control may not yield a suitable travel experience.

In contrast, viable control of lateral direction (that is, left/right steering control) may be addressed within the immediate environment of the vehicle 100, and use of short and/or medium range sensors (for example, LiDAR based sensors, proximity sensors, etc.). With respect to the example of velocity control, aspects may generally apply to collision avoidance principles, such that when an object is sensed as blocking a path of a vehicle, an autonomous control system prompts a braking and/or rapid deceleration response. Based on the deep neural network training (as discussed in detail with respect to FIGS. 4, 5A and 5B, the vehicle control unit 200 of the vehicle 100 has learn through training of the autonomous decision device 304 the basic rules of the road with respect to stop/yield signage. For example, deep learning techniques applied to the autonomous decision device 304 develops a knowledge base relating to these rules, such as to avoid impact with a vehicle ahead, to yield/stop at stop/yield signage 506, to stay within lane markings (whether designated by painted markings to a pathway surface, and/or other markings such as curbs, grass mediums (that is different surfaces), etc., autonomously accelerates and enters the turnabouts towards indicator 616.

Figure 7:
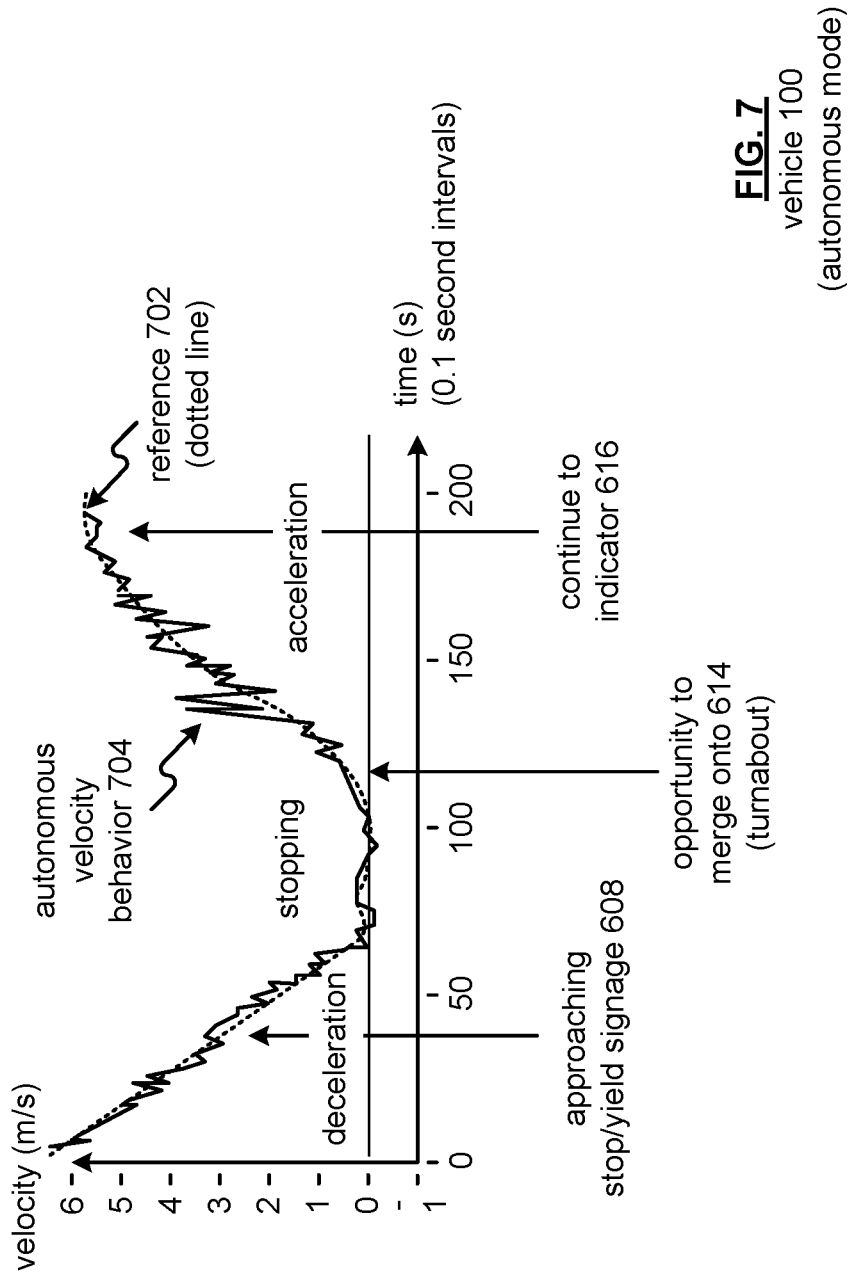
FIG. 7 illustrates an example graph of autonomous velocity behaviors for desired vehicle operation control data.

FIG. 7 illustrates an example graph of autonomous velocity behaviors 704 as contrasted with a reference 702. The graph is based upon the example driving map data 302 of FIGS. 6A and 6B and simulated autonomous performance of the vehicle 100.

As shown, with regard to velocity control signals, the velocity for an autonomous vehicle 100 (simulated and/or live), generally conforms to the velocity reference curve 702. Selective points within the regions of deceleration, stopping, and acceleration, reflect expected vehicle behavior through digital data.

Based on the autonomous velocity behavior 704 with respect to the reference 702, an autonomous vehicle slows on approach to the roundabout, and comes to a stop based on the decision of the autonomous decision device 304.R A learned rule, discerned from the experience provided through the training map data 318, is proceeding when the route is clear, or safe to enter by the vehicle 100. Once the way is clear (based on samples to train the deep neural network), the vehicle 100 autonomously enters the roundabout, increasing the rate of acceleration from the stop signage 608.

The vehicle sensor data 216 inputs a state representation relayed by mapping data 318 to train an autonomous decision device 304 (see FIG. 3). In turn, the autonomous decision device 304 may employ image recognition to generate desired vehicle operational data 310, which may then be generated as vehicle actuator control data 314 by actuator control signal generator 312.

Figure 8:
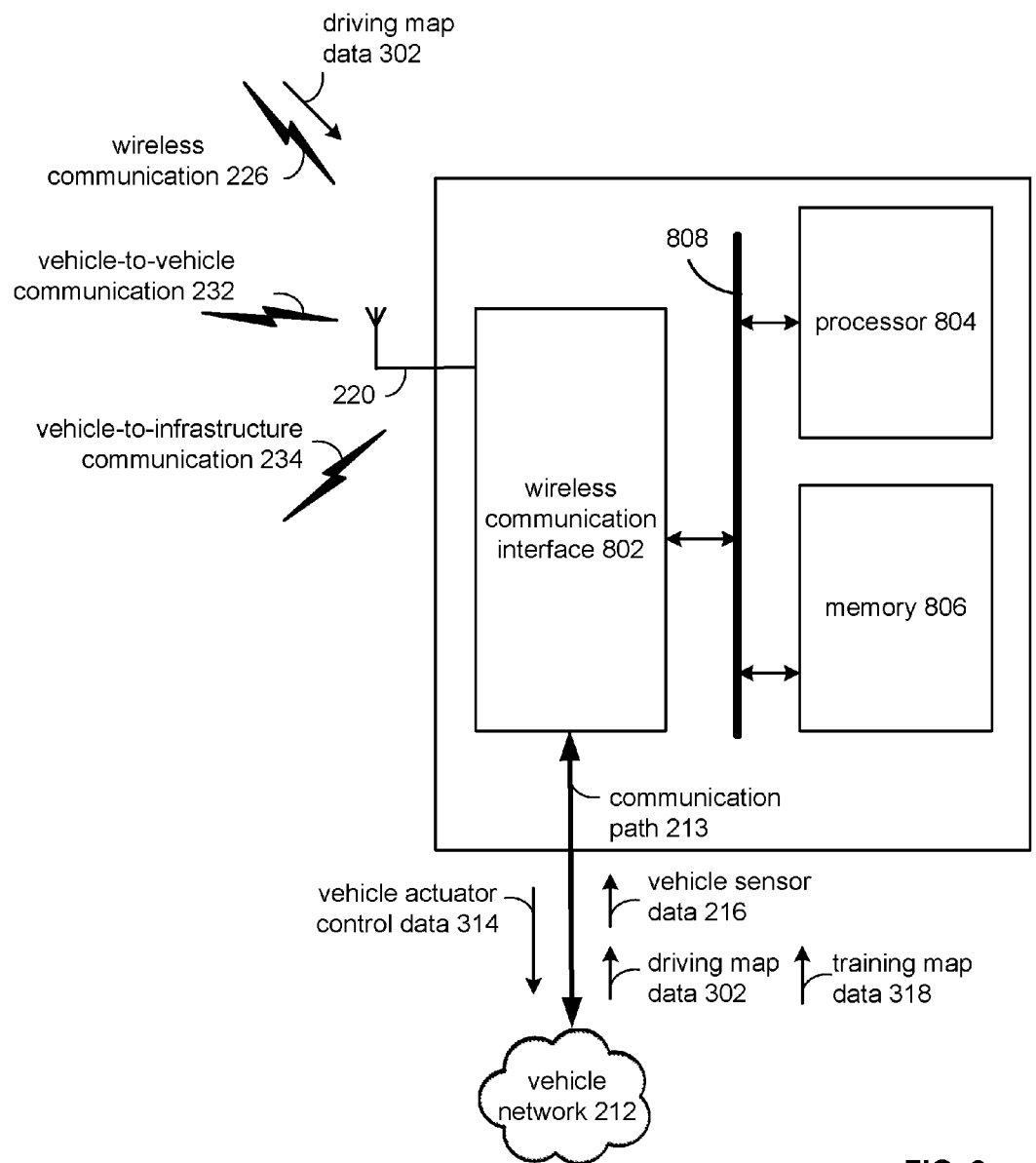
FIG. 8 illustrates a block diagram of a vehicle control unit 200 of FIGS. 1 and 2.

FIG. 8 is an illustration of a block diagram of a vehicle control unit 200 of FIG. 2, which includes a communication interface 802, a processor 804, and memory 806, that are communicatively coupled via a bus 808.

As may be appreciated, similar architectures, structures and/or platforms to those illustrated and described in detail with respect to FIG. 8 may be employed with other control units and/or devices of the vehicle network 201 such as illustrated in FIG. 2, such as the audio/visual control unit 208, the local network 212, the sensor control unit 214, the engine control unit (ECU) 240, etc.

The processor 804 in the vehicle control unit 200 can be a conventional central processing unit or any other type of device, or multiple devices, capable of manipulating or processing information. As may be appreciated, processor 804 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 806 may be a single memory device, a plurality of memory devices, and/or embedded circuitry of the processor 804. Such a memory device may be a read-only memory, random access memory, volatile memory, non-volatile memory, static memory, dynamic memory, flash memory, cache memory, and/or any device that stores digital information. The memory 806 is capable of storing machine readable instructions such that the machine readable instructions can be accessed by the processor 804. The machine readable instructions can comprise logic or algorithm(s) written in programming languages, and generations thereof, (e.g., 1GL, 2GL, 3GL, 4GL, or 5GL) such as, for example, machine language that may be directly executed by the processor 804, or assembly language, object-oriented programming (OOP), scripting languages, microcode, etc., that may be compiled or assembled into machine readable instructions and stored on the memory 806. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 804 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 804 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 804 executes, hard coded and/or operational instructions corresponding to at least some of the steps and/or functions illustrated in FIGS. 1-9 to assess a nature of a vehicle acceleration and to provide near real-time feedback features and methods described herein.

The wireless communications interface 802 generally governs and manages the vehicle user input data, via driving map data 302, over the vehicle network 212 and the communication path 213 and/or wireless communication 226. The wireless communication interface 802 also manages vehicle control unit 200 output data such as vehicle actuator control data 314 for autonomous control of some and/or all powertrain actuator devices. There is no restriction on the present disclosure operating on any particular hardware arrangement and therefore the basic features herein may be substituted, removed, added to, or otherwise modified for improved hardware and/or firmware arrangements as they may develop.

The sensor data 216 received via the communication path 213 includes capturing of intensity or reflectivity returns of the environment surrounding the vehicle, instantaneous vehicle speed data, and acceleration data for determining acceleration state for providing input to generate training map data 318 for further training of the autonomous decision device 304 (see FIG. 3), and/or receive training map data 318 from other sources. In general, data 216 captured by the sensor devices 102, 252, 254 and/or nnn and provided to the vehicle network 201 via the communication path 213 can be used by one or more of applications of the vehicle to assess velocity and/or acceleration state(s), as well as wheel angle states, of the vehicle 100.

The antenna 220, with the wireless communications interface 306, operates to provide wireless communications with the vehicle control unit 200, including wireless communication 226.

Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

Figure 9:
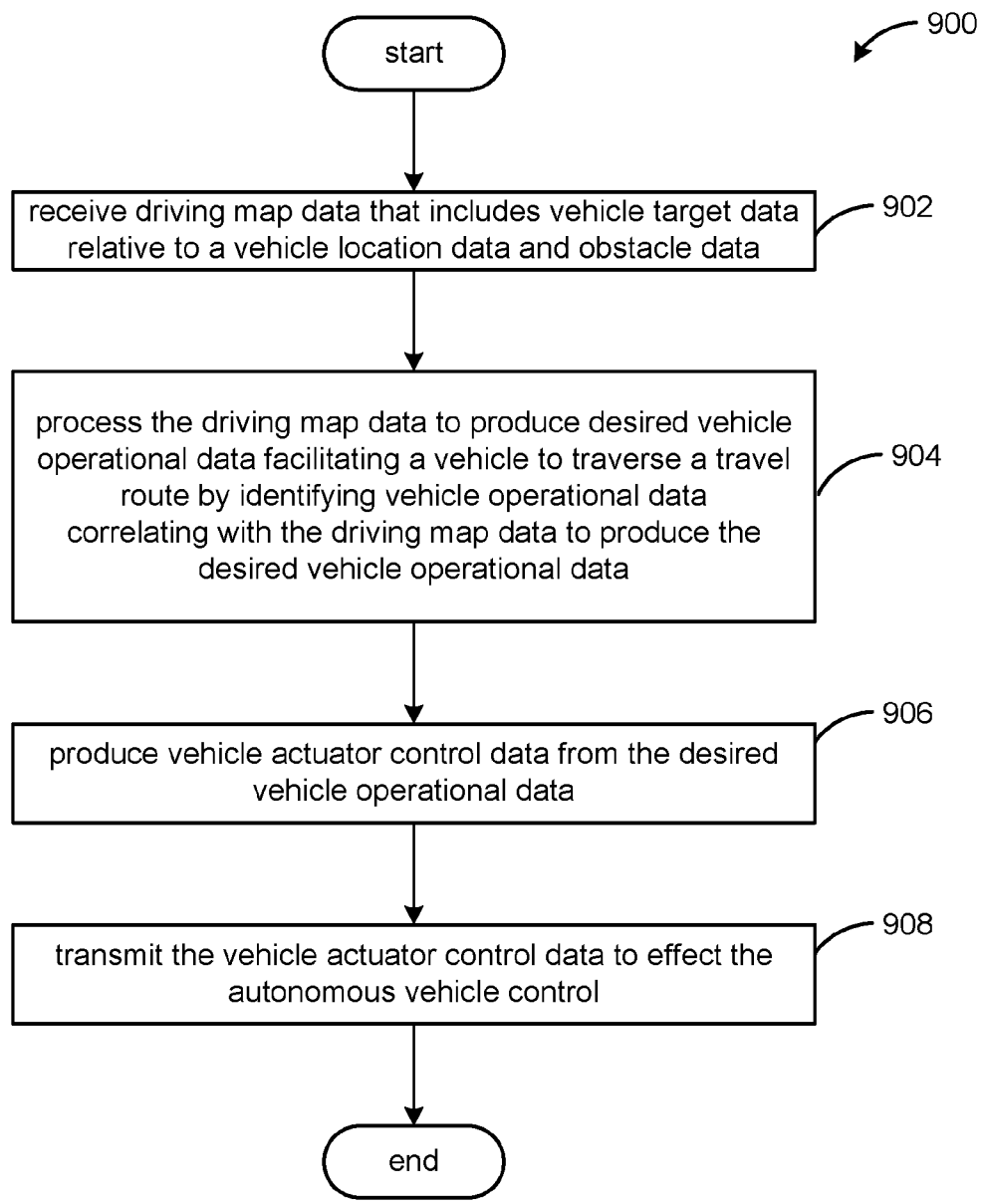
FIG. 9 illustrates an example process in a vehicle control unit for effecting vehicle control.

FIG. 9 illustrates an example process 900 in a vehicle control unit 200 of FIG. 8 for effecting vehicle control.

At operation 902, a vehicle control unit receives driving map data, which includes vehicle target data relative to a vehicle location data of a vehicle. An autonomous decision device, at operation 904, processes the driving map data to produce desired vehicle operational data. The desired vehicle operational data facilitates a vehicle to traverse a travel route by identifying vehicle operational data that correlates with the driving map data to produce the desired vehicle operational data.

The desired vehicle operational data provides for a vehicle to be capable of traversing the travel route in either of an autonomous mode and a driver-assist mode. In an autonomous mode, the vehicle control unit 200 may be used to control one or more of the vehicle systems without the vehicle user's direct intervention. In a driver-assist mode, operation of the vehicle 100 (see FIG. 1) may be shared between a vehicle user and control units. For example, while in the driver-assist mode, the vehicle user can control certain aspects of the vehicle operation, such as steering (and steering angle), while the vehicle control unit 200 can control other aspects of the vehicle operation, such as braking (engine and wheel), velocity, and acceleration rate.

Also, as may be appreciated, the autonomous decision device operates to correlate the driving map data with a temporal sequence of data that may be associated with vehicle operational data to produce the desired vehicle operational data. In an aspect of a deep learning system, such as a deep neural network that is discussed in detail herein, the autonomous decision device receives training map data to train the deep learning system to recognize data and, based on the recognition, produce desired vehicle operational data (as contrasted with an image recognition determination). In other words, a learned functional output can be generated as a result of prior training on data samples as discussed in detail herein.

With respect to motion functions of a vehicle 100 (such as velocity and acceleration rate) based on learned and/or experienced driving behaviors, autonomous or driver-assisted modes are capable of strategic longitudinal behaviors, that may be augmented by short-range factors (travel route obstructions such as other vehicles, pedestrians, roadway debris, etc.) that may be detected by proximity sensor devices (such as sensor input device 104, video sensor device 106, etc.).

With the desired vehicle operational data 310, the vehicle control unit 200 produces at operation 906 vehicle actuator control data from the desired vehicle operational data.

As may be appreciated, the desired vehicle operational data may be provided in various ways. For the example of velocity and steering angle functions, the operational data may simply be a crisp and/or fuzzy desired velocity value (such as faster, much faster, slower, much slower, etc.) and a general crisp and/or fuzzy steering angle value (such as slight right, slight left, hard right, hard left, etc.). Other forms of data values may be provided, such as setting the velocity speed (10 mph, 20 mph, 30 mph, etc.) and steering angle (10-degrees, 20-degrees, etc.), or as a vector, indicating magnitude (such as velocity) and associated angle of travel (for example, 10-degrees of north, etc.).

The vehicle control unit 200, at operation 908, transmits the vehicle actuator control data to effect the autonomous vehicle control. Examples of devices that may receive the vehicle actuator control data may be other control units, such as an engine control unit 240, a transmission control unit (not shown), and an audio/visual control unit 208 for display by the head unit 202. The vehicle actuator control data may also be distributed to additional devices advisory feedback to a vehicle user and/or to receive further input (such as to override the data by placing the vehicle 100 into a manual mode to return control to the vehicle user).

Figure 10:
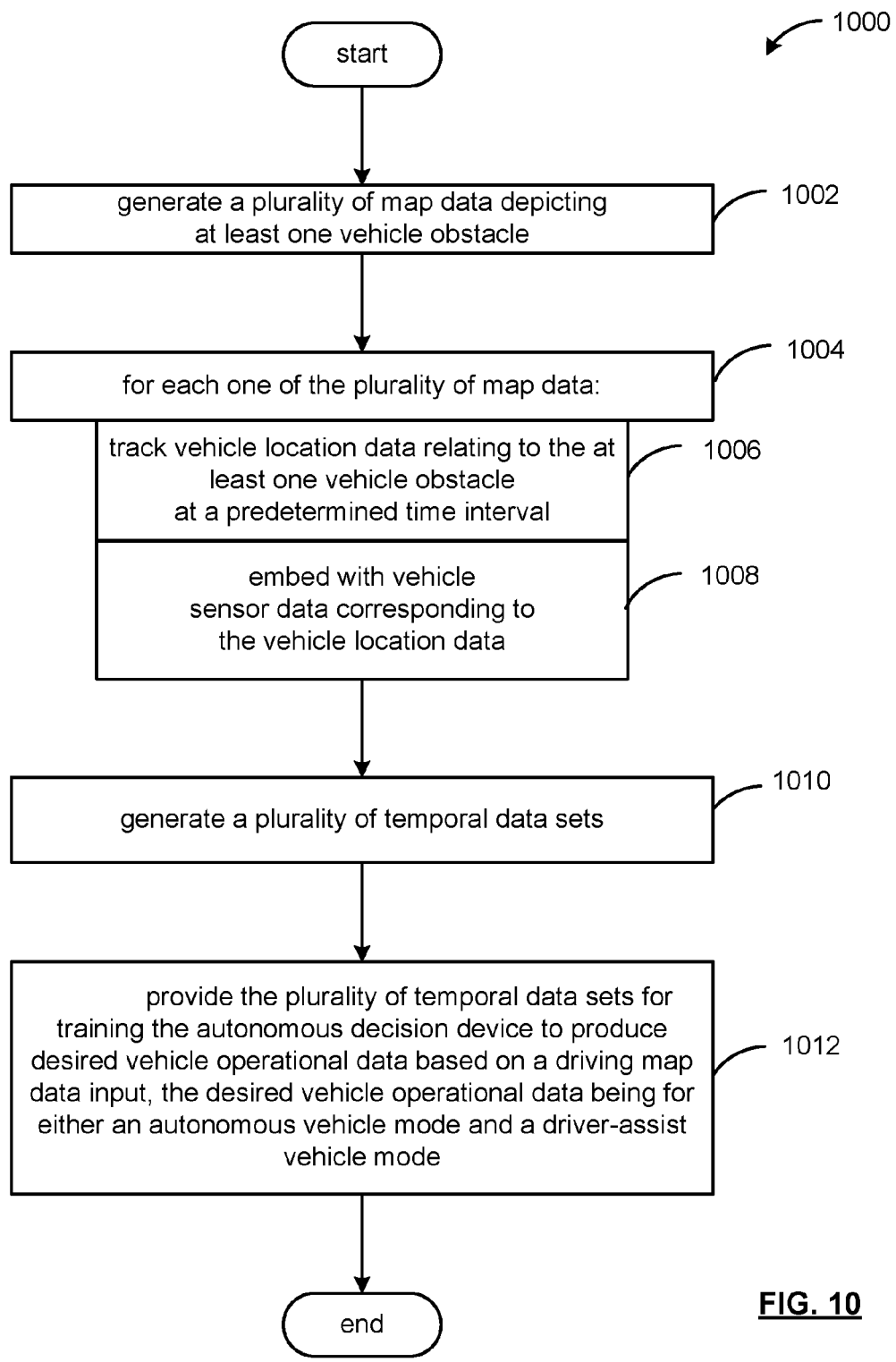
FIG. 10 illustrates an example process to generate a training mapping data input for an autonomous decision device of a vehicle control unit.

FIG. 10 illustrates an example process 1000 to generate a training input for an autonomous decision device for a vehicle control unit 200 of FIG. 8. A vehicle control unit 200, at operation 1002, generates a plurality of map data depicting at least one vehicle obstacle, which may include travel route characteristics affecting velocity rates, steering wheel angle, acceleration rate, etc., such as curves in the roads, traffic signals, other vehicles, turnabouts, and the like.

At operation 1004, for each one of the plurality of map data, vehicle location data is tracked through operation 1006. The tracking relates to the at least one vehicle obstacle at predetermined time intervals. In this manner, vehicle location data is keyed or aligned with time sequences. At operation 1008, the vehicle sensor data associated with each of the predetermined time intervals is embedded with map data and embedded and/or otherwise associated with the vehicle location data.

From the plurality of map data, a plurality of temporal data sets are generated at operation 1010. Each of the temporal data sets may include a plurality of temporally-sequenced data from image channels (such as, for example, a red channel, a green channel, a blue channel from an RGB color scheme, or from other color schemes such as RGBA, YUV, PAL color encoding, YIQ, and/or variations thereof.).

The temporal data sets, at operation 1012, may be provided for training an autonomous decision device. Upon the training, the autonomous decision device may produce desired vehicle operational data based on driving map data inputs. The desired vehicle operational data being for either an autonomous vehicle mode or a driver-assist vehicle mode.

As may be appreciated, the mapping data may be in a two-dimensional format or a three-dimensional format. As contrasted to a first person view, or driver perspective view, training a deep learning system of the autonomous decision device to produce expected vehicle operational data, as contrasted with instantaneous decisions affected by an immediate environment of the vehicle 100. For example, with respect to longitudinal functions of a vehicle 100 (such with velocity and acceleration rate) autonomous and/or driver-assisted modes are capable of strategic longitudinal behaviors, that may be augmented by short-range factors (travel route obstructions such as other vehicles, pedestrians, roadway debris, etc.) detected by local proximity sensor devices (such as sensor input device 104, video sensor device 106, etc.).

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" may be used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for generating autonomous and/or driver-assisted vehicle operational controls based map data recognition techniques.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in a vehicle control unit for controlling a vehicle, the method comprising:
   receiving driving map data that is a composition of separate temporal observations within a single composite image including vehicle target data relative to a vehicle location data and obstacle data that characterizes temporal aspects of dynamic obstacles;
   processing, using a machine learning model, the driving map data to produce driving controls for traversing a travel route through the location, wherein the machine learning model identifies vehicle operational data correlating with the driving map data to produce the driving controls;
   and
   transmitting the driving controls to effect control of the vehicle over the travel route.

2. The method of claim 1, wherein receiving the driving map data includes generating the driving map data by combining the temporal observations to form the driving map data as a composite image, wherein generating the temporal observations includes encoding the observations on separate color channels of the composite image, wherein the temporal observations include at least perceptions by sensors of the vehicle, wherein the desired vehicle operational data includes at least one of:
   vehicle velocity control data;
   vehicle acceleration control data;
   steering wheel angle control data;
   vehicle braking data; and
   vehicle engine braking data.

3. The method of claim 1, wherein the machine learning model is an autonomous decision device further comprising:
   a deep neural network being trained on a plurality of temporal data sets, wherein each of the plurality of temporal data sets including a plurality of sequenced data having a corresponding vehicle control signal.

4. The method of claim 3, wherein each of the plurality of sequenced data being spaced with respect to one another by a predetermined time interval.

5. The method of claim 4, wherein the plurality of sequenced data comprising:
   time-series data operating to convey spatial information relating to the vehicle;
   subsequent time-series data operating to convey velocity information relating to the vehicle; and
   further subsequent time-series data operating to convey acceleration information relating to the vehicle.

6. The method of claim 3, wherein the deep neural network comprising a multi-layer artificial neural network.

7. The method of claim 1, wherein the processing the driving map data to produce desired vehicle operation data further comprising:
   segmenting the driving map data to produce a plurality of map segments having dimensions that correspond to an input size of the machine learning algorithm, each of the map segments including an indicator to the vehicle target data;
   determine whether one of the map segments includes the vehicle location data;
   when the one of the map segments includes the vehicle location data:
      identifying a relationship of an obstacle of the one of the plurality of segmented driving map data; and
      producing the desired vehicle operational data based on the relationship.

8. A vehicle control unit for controlling a vehicle, the vehicle control unit comprising:
   a wireless communication interface to service communication with a vehicle network;
   a processor coupled to the wireless communication interface, the processor for controlling operations of the vehicle control unit; and
   a memory coupled to the processor, the memory for storing data and program instructions used by the processor, the processor configured to execute the program instructions stored in the memory to:
      receive driving map data that is a composition of separate temporal observations within a single composite image including vehicle target data relative to a vehicle location data and obstacle data that characterizes temporal aspects of dynamic obstacles;
      process the driving map data using a machine learning model to produce driving controls for traversing a travel route, wherein the machine learning model identifies vehicle operational data correlating with the driving map data to produce the driving controls; and
      transmit, via the wireless communication interface, the driving controls to effect control of the vehicle over the travel route.

9. The vehicle control unit of claim 8, wherein the program instructions to receive the driving map data include program instructions to generate the driving map data by combining the temporal observations to form the driving map data as a composite image, wherein generating the temporal observations includes encoding the observations on separate color channels of the composite image, wherein the temporal observations include at least perceptions by sensors of the vehicle, and wherein the desired vehicle operational data includes at least one of:
   vehicle velocity data;
   vehicle acceleration data;
   steering wheel angle;
   vehicle braking data; and
   vehicle engine braking data.

10. The vehicle control unit of claim 8, wherein
   the machine learning model is a deep neural network trained on a temporal sequence of data for a plurality of temporal data sets, wherein each of the plurality of temporal data sets including a plurality of time-series data being accompanied by vehicle sensor data.

11. The vehicle control unit of claim 10, wherein the plurality of time-series data being separately spaced according to a predetermined time interval.

12. The vehicle control unit of claim 11, wherein:
   a time-series data of the plurality of time-series data operates to convey spatial information relating to the vehicle;
   a subsequent time-series data of the plurality of time-series data operates to convey velocity information relating to the vehicle; and
   a further subsequent time-series data of the plurality of time-series data operates to convey acceleration information relating to the vehicle.

13. The vehicle control unit of claim 10, wherein the deep neural network comprising a multi-layer artificial neural network.

14. The vehicle control unit of claim 8, wherein the program instructions to process the driving map data include program instructions to produce the vehicle operation data by:

retrieving obstacle mapping data related to the driving map data;
  segmenting the driving map data to produce a plurality of map segments having dimensions that correspond to an input size of the machine learning algorithm, each of the map segments including an indicator to the vehicle target data;
  determine whether one of the map segments includes the vehicle location data;
  when the one of the map segments includes the vehicle location data:
    identifying a relationship of an obstacle of the one of the map segments; and
    producing the desired vehicle operational data based, at least in part, on the relationship.

* * * * *